US012650330B2

(12) United States Patent (10) Patent No.: US 12,650,330 B2
Galeev et al. (45) Date of Patent: Jun. 9, 2026

(54) METHOD FOR MEASURING THE LOAD ON A VEHICLE AXLE WITH TEMPERATURE COMPENSATION USING A STRAIN GAUGE (VARIANTS)

(71) Applicant: OBSHCHESTVO S OGRANICHENNOJ OTVETSTVENNOST'YU "VESA SISTEM", g. Naberezhnye Chelny (RU)

(72) Inventors: Ruslan Il'gizovich Galeev, der. Starye Erykly (RU); Damir Talgatevich Sitdikov, d. Az'mushkino (RU)

(73) Assignee: OBSHCHESTVO S OGRANICHENNOJ OTVETSTVENNOST'YU "VESA SISTEM", G. Naberezhnye Chelny (RU)

( * ) Notice: Subject to any disclaimer, the term of this patent is extended or adjusted under 35 U.S.C. 154(b) by 285 days.

(21) Appl. No.: 18/550,631

(22) PCT Filed: Jun. 6, 2022

(86) PCT No.: PCT/RU2022/000186
§ 371 (c)(1),
(2) Date: Sep. 14, 2023

(87) PCT Pub. No.: WO2022/265533
PCT Pub. Date: Dec. 22, 2022

(65) Prior Publication Data
US 2024/0295430 A1 Sep. 5, 2024

(30) Foreign Application Priority Data
Jun. 15, 2021 (RU) ................................ 2021117368

(51) Int. Cl.
*G01G 19/12* (2006.01)
*G01G 3/14* (2006.01)

(52) U.S. Cl.
CPC ........... *G01G 19/12* (2013.01); *G01G 3/1418* (2013.01)

(58) Field of Classification Search
CPC ..... G01G 19/12; G01G 3/1418; G01L 1/2206
See application file for complete search history.

(56) References Cited

U.S. PATENT DOCUMENTS 3,283,838 A * 11/1966 Fetterman .............. G01G 19/12
177/25.14
3,669,756 A * 6/1972 Bradley ............... G01G 3/1406
177/229
(Continued)

FOREIGN PATENT DOCUMENTS

CN 102147319 A * 8/2011
DE 112018002807 T5 * 4/2020 ............... G01K 1/20
(Continued)

OTHER PUBLICATIONS

International Search Report for PCT/RU2022/000186 dated Oct. 6, 2022, 4 pages.
(Continued)

*Primary Examiner* — Natalie Huls
(74) *Attorney, Agent, or Firm* — Nixon & Vanderhye PC

(57) ABSTRACT
The invention relates to measuring technology, and more particularly to weighing devices, and can be used for determining gross vehicle weight, load weight and the load on a vehicle axle. The method includes receiving a first electrical output signal from a strain gauge that is mounted on an axle of a vehicle and measures the tensile and compressive strain on the axle along the longitudinal axis thereof, receiving a second electrical output signal from a strain gauge that is mounted on the axle of the vehicle and measures the tensile
(Continued)

Figure 1:
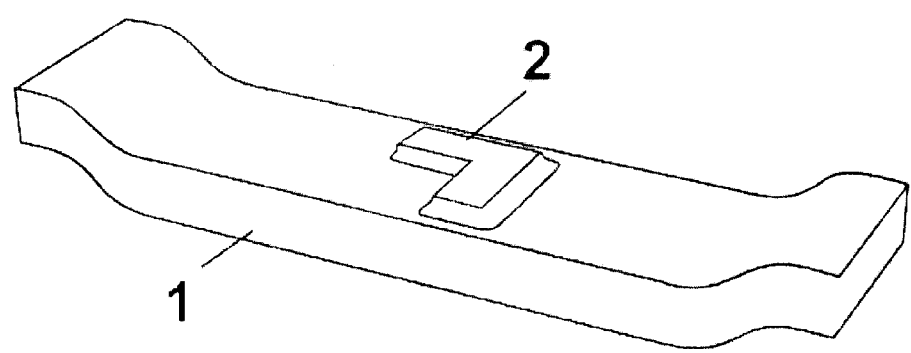
Figure 1:
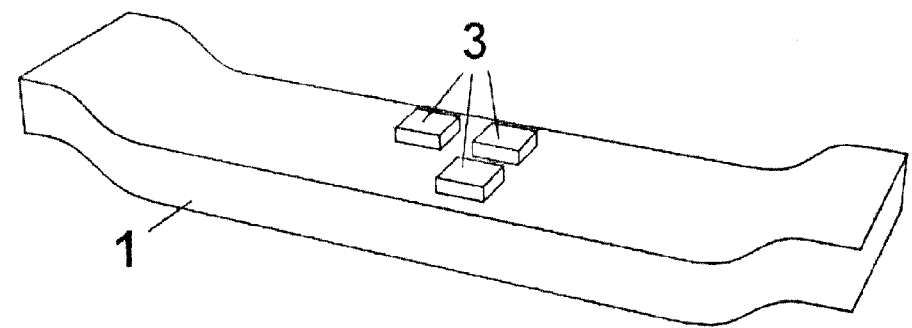
Figure 1:
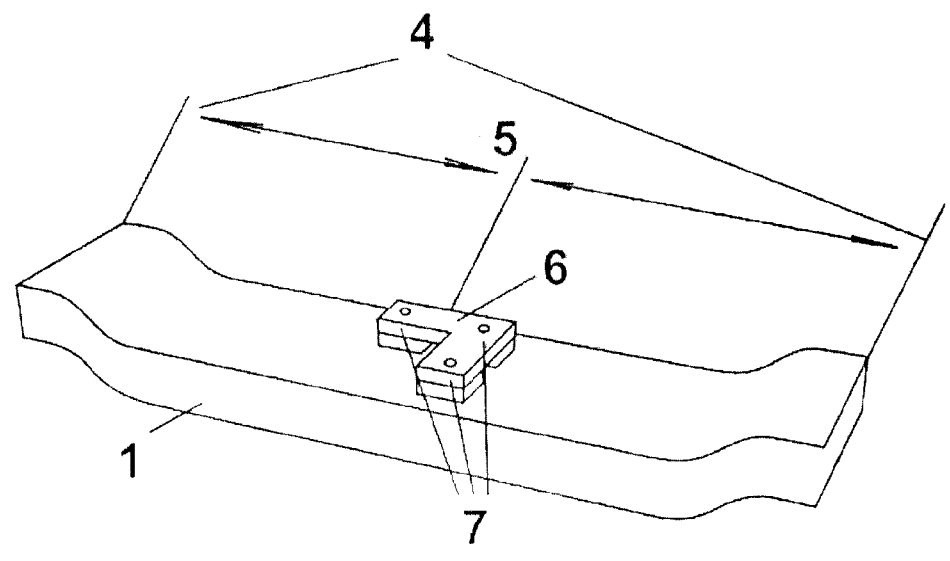

and compressive strain on the axle along the transverse axis thereof, and calculating the value of the load on the axle of the vehicle on the basis of the difference between said first and second electrical output signals. The technical result consists in minimizing the effect of fluctuations in the ambient temperature on the readings of a strain gauge mounted on the axle of a vehicle.

15 Claims, 3 Drawing Sheets

(56) References Cited

U.S. PATENT DOCUMENTS

| | | | | |
|---|---|---|---|---|
| 3,864,966 | A * | 2/1975 | Seitz ..................... | G01G 3/1406 |
| | | | | 338/3 |
| 4,042,049 | A | 8/1977 | Reichow et al. | |
| 4,086,576 | A * | 4/1978 | Jebb ....................... | G01G 19/12 |
| | | | | 340/440 |
| 5,539,158 | A * | 7/1996 | Utsunomiya ......... | G01L 1/2243 |
| | | | | 73/862.632 |
| 5,892,139 | A * | 4/1999 | Miyazaki ................ | H10F 39/80 |
| | | | | 73/146 |
| 7,478,001 | B2 | 1/2009 | Fasig et al. | |
| 9,121,747 | B2 | 9/2015 | Mian et al. | |
| 2011/0023630 | A1 * | 2/2011 | Zandman .............. | G01L 1/2243 |
| | | | | 29/595 |
| 2019/0120684 | A1 * | 4/2019 | Oren ...................... | G01G 19/12 |

FOREIGN PATENT DOCUMENTS

| | | | |
|---|---|---|---|
| JP | 3783073 | B2 * | 6/2006 |
| RU | 68991 | U1 | 12/2007 |
| RU | 2711183 | C1 | 1/2020 |

OTHER PUBLICATIONS

Written Opinion of the ISA for PCT/RU2022/000186 dated Oct. 6, 2022, 4 pages.

* cited by examiner

METHOD FOR MEASURING THE LOAD ON A VEHICLE AXLE WITH TEMPERATURE COMPENSATION USING A STRAIN GAUGE (VARIANTS)

This application is the U.S. national phase of International Application No. PCT/RU2022/000186 filed Jun. 6, 2022 which designated the U.S. and claims priority to RU 2021117368 filed Jun. 15, 2021, the entire contents of each of which are hereby incorporated by reference.

The proposed method for measuring vehicle axle load using a temperature-compensated strain gauge (which may be a tensometric gauge, vibrating-wire gauge or other types of gauges) refers to weight measuring devices and can be used to determine the total weight and axle load of the vehicle, as well as the cargo weight.

Currently, the operation of strain gauges used amid significant fluctuations of ambient temperature ranging from −50° C. to +70° C. presents a significant challenge. In such environment, the accuracy of the axle load measurement decreases substantially, and the electrical output signal of the strain gauge caused by the applied load becomes comparable to the electrical output signal of the strain gauge caused by the change in the ambient temperature.

The main challenge arising in the use of strain gauges to measure the vehicle axle loads occurs when the system is operated amid significant fluctuations of ambient temperature ranging from −50° C. to +70° C. In this case, it should be taken into account that, due to the brake and drive loads, the driving axles of the vehicle (gearbox axles) may heat up to +70° C., which can lead to a temperature difference of up to 5° C. between the gauge and the axle. As a result, in addition to the ambient temperature, the electrical output signal of the strain gauge is affected by the temperature difference between the strain gauge and the vehicle axle. In such harsh operating environment, the electrical output signal of the strain gauge should reflect only the load characteristics without responding to the fluctuations in temperature of ambient environment and the vehicle axle.

The investigation of the prior art by the applicant revealed various analogs of the claimed technical solution in terms of the same set of features describing a method for measuring the vehicle axle load using a temperature-compensated strain gauge, which are discussed below in more detail.

The investigation of the prior art revealed a patented invention (U.S. Pat. No. 4,042,049A, IPC G01G19/12, published on Aug. 16, 1977). In its essence, it refers to a load measuring system for a tandem-wheeled vehicle (with a tandem bogie). The tandem axles of the vehicle engage opposite ends of two transversely spaced equalizing beams having their midpoints pivotally supporting the vehicle. Deflections of the equalizing beams and front axle, responsive to loading of the vehicle, are sensed by a strain gauge (load cell transducer) mounted on each equalizing beam and on the front axle. An amplifying circuit receives the outputs from the gauge and drives a load indicator. The load indicator provides a visual indication of front and rear wheel axle loading with respect to a preset maximum load point.

The disadvantage of this system is that it is not temperature-compensated and is prone to inaccurate weight readings due to changes occurring in the strain gauge under the influence of ambient temperature. Such temperature changes reflect no real difference in the vehicle's load, but influence the output signal from the strain gauge. The strain gauge described in the patent measures the deflection of each equalizing beam and front axle of the vehicle and, using a linear calibration function, the readings received from the gauge are converted to weight measurements. The front axle and equalizing beam of the vehicle have coefficients of thermal expansion that are different from the one for the gauge and this, subsequently, affects the output signal of the gauge and prevents it from reflecting the actual load on the axle.

The investigation of the prior art revealed a patented invention (RU2711183, IPC G01L1/22, G01G19/12, G01B7/16, published on Jan. 15, 2020). In its essence, it refers to a strain gauge to measure the load on cargo vehicle axle, which consists of an assembly containing two pairs of perpendicular constantan foil type strain gauges that represent a Wheatson bridge circuit attached by adhesives to the geometrical center of arc-like, pre-polished by manual or semi-mechanical method to at least purity grade 7, and degreased surface of the metal-made element of the gauge design, which contains a strain gauge assembly's electronic signal processing module integrated into the gauge housing and includes a 32-bit Cortex-MO core processor, high-precision digital temperature sensor for implementing temperature-compensated process, NFC module to identify the gauge and transmit service information wirelessly to external wireless reader and CAN interface to transmit data wirelessly to the system monitor for further processing and indication, and the metal part of the gauge housing is made of 40CrNiMoA alloy steel, and the plastic part of the housing is made of impact-resistant and oil-resistant glass-filled polyamide, and all internal design elements are protected by Etal-1480TG damping moisture-resistant compound.

The disadvantage of the strain gauge for measuring the axle load is that the temperature-compensated process is implemented only for the gauge, rather than with regard of the difference between the coefficients of thermal expansion of the vehicle axle and the strain gauge.

The invention patented under U.S. Pat. No. 7,478,001 (IPC G01G23/01, G01G19/08, published on Oct. 23, 2008) is closest to the claimed technical solution in terms of its essential feature set and purpose. In its essence, it refers to a method for temperature-compensated weight measurement, which includes receiving a first output signal from a load sensor device coupled to a structural member, receiving a second output signal from a temperature sensor device, and calculating a load weight value by using the first output signal and the second output signal, and applying a statistically-generated temperature compensation factor.

The disadvantage of this method is that it binds the sensor's calibration curve to the specific axle where the sensor is mounted. This results in either calibrating each sensor individually at three different temperatures and three different loads, or using the average calibration characteristic for a given vehicle axle material. Such approach allows to keep the weight measurement error low (up to 0.5 percent for individual calibration and up to 2 percent for selection of averaged factors), but it is extremely labor-intensive and requires considerable financial costs.

Thus, in view of the above known circumstances, there is a need for a cost-effective on-board weighing system based on strain gauges and operating within a wide range of temperatures and ensuring a low error margin of no more than 2%. The output signal of the strain gauge should reflect only the load characteristics without responding to the fluctuations in temperature.

The task of this invention is to lower the effect of ambient temperature and temperature difference between the strain gauge and the vehicle axle on the electrical output signal of the strain gauge, which will reduce the error margin of axle load measurement to 2% within a wide range of ambient temperature (from −50° C. to +70° C.).

This task is addressed by the method for measuring the vehicle axle load, which includes obtaining the first electrical output signal from the strain gauge mounted on the vehicle axle and measuring the tensile/compressive strain of that axle along its longitudinal axis, obtaining the second electrical output signal from the gauge mounted on the vehicle axle and measuring the tensile/compressive strain of that axle along its transverse axis, and calculating the vehicle axle load based on the difference between the first and the second electrical output signals.

This task is also addressed by using a variant of the method for measuring the vehicle axle load, which includes obtaining the first electrical output signal from the strain gauge mounted on the upper plane of the vehicle axle and measuring the tensile/compressive strain of that axle along its longitudinal axis, obtaining the second electrical output signal from the gauge mounted on the lower plane of the vehicle axle and measuring the tensile/compressive strain of that axle along its longitudinal axis, and calculating the vehicle axle load based on the difference between the first and the second electrical output signals.

The claimed technical solution is explained by the drawings, where:

FIG. 1. shows a potential embodiment of a temperature-compensated axle load measurement using a strain gauge, which is made of two strain gauges mounted within a single housing and measuring the strain in two mutually perpendicular directions on the truck's steering axle. In this example, the strain gauge (6) is mounted on the axle beam (1) either with three welded brackets (3) or on a casting (2) made at the time of manufacturing the axle beam (1). The strain gauge (6) is attached to the brackets (3), or to the casting (2) with three fasteners (7). The strain gauge (6) is centered on the centerline (5) of the axle beam (1) and is equidistant from the vehicle springs (4).

Figure 2:
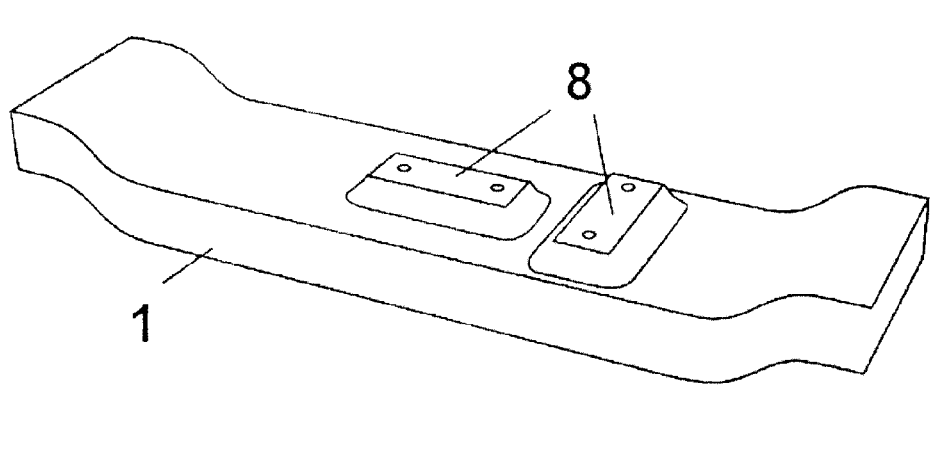
Figure 2:
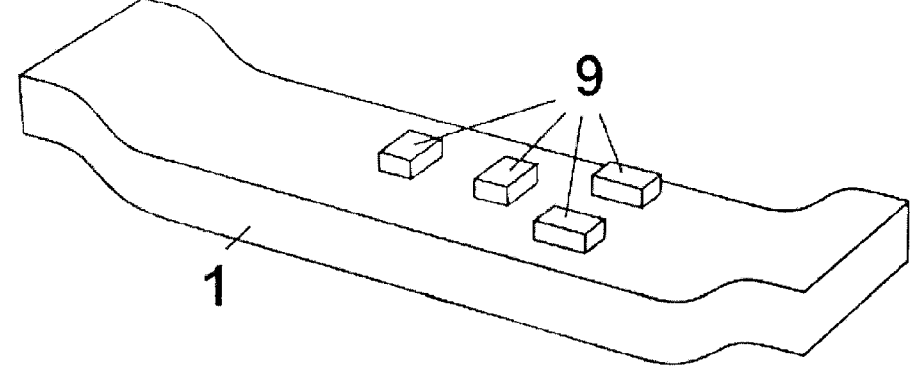
Figure 2:
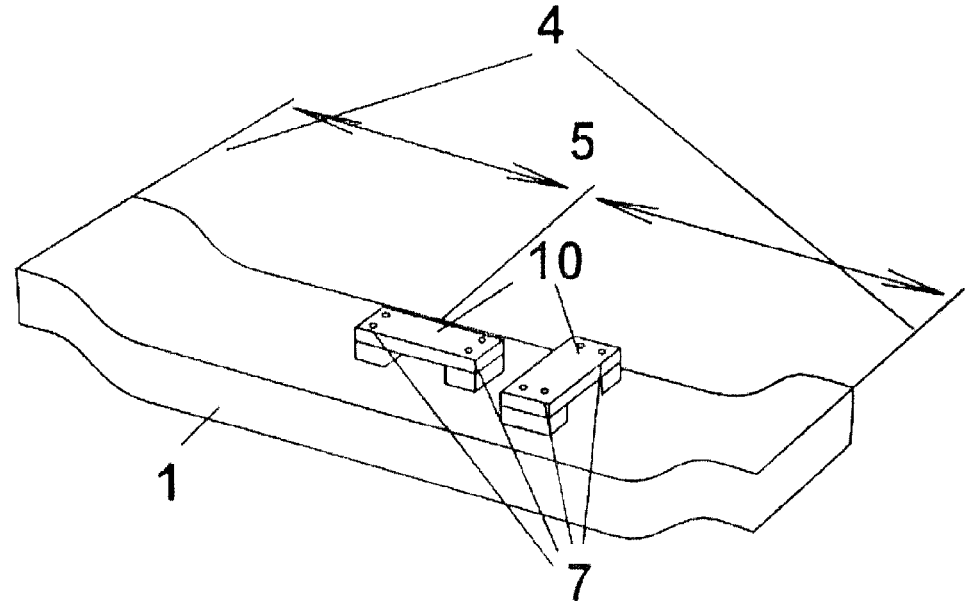

FIG. 2. shows a potential embodiment of a temperature-compensated axle load measurement using two separate identical strain gauges mounted in mutually perpendicular directions on the truck's steering axle. In this example, the strain gauges (10) are mounted on the axle beam (1) either directly with adhesive or with four welded brackets (9), or on castings (8) made at the time of manufacturing the axle beam (1). The strain gauges (10) are attached to the brackets (9), or to the casting (8) with four fasteners (7). The strain gauge (10) is centered on the centerline (5) of the axle beam (1) and is equidistant from the vehicle springs (4).

Figure 3:
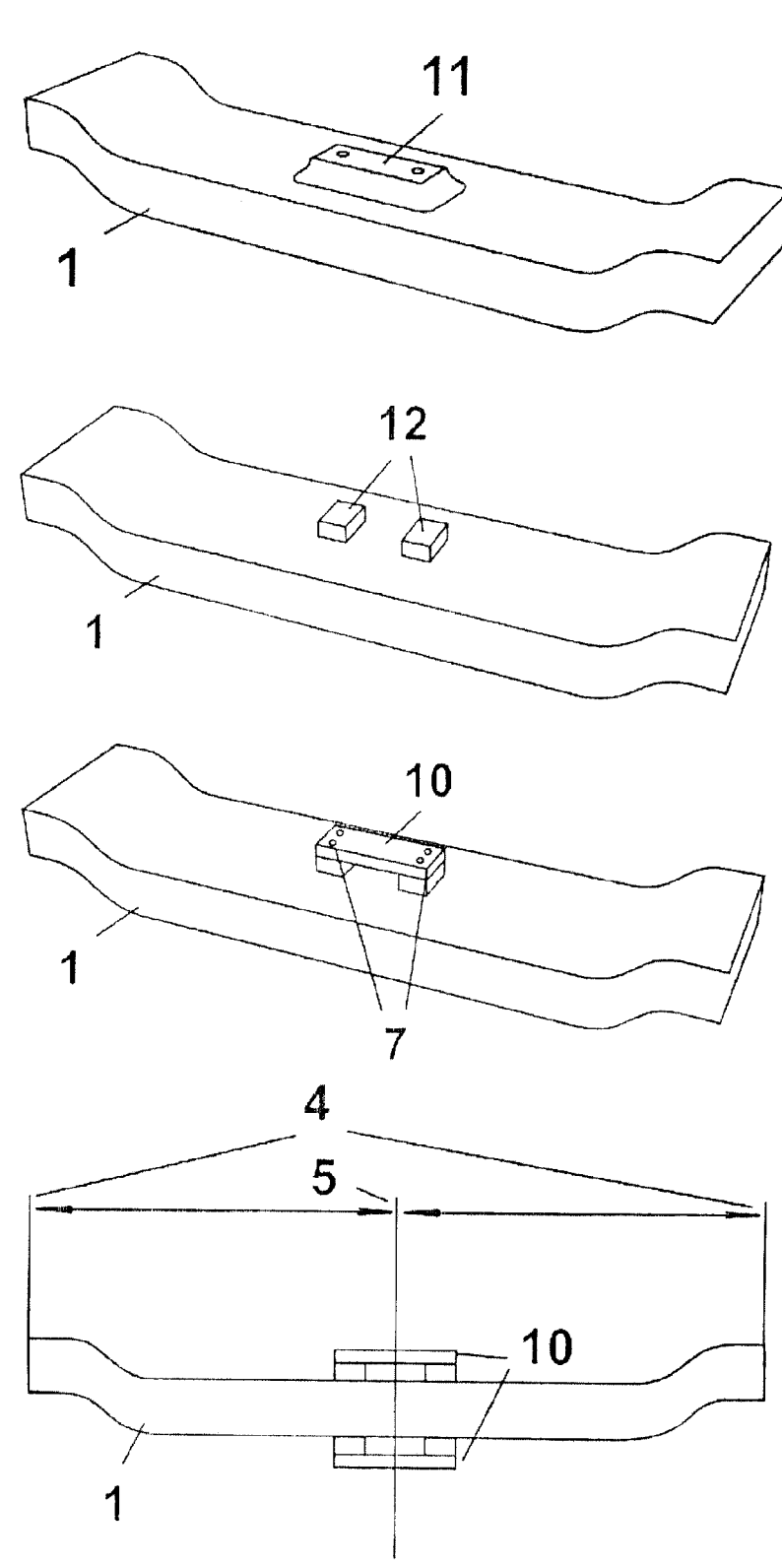

FIG. 3. shows a potential embodiment of a temperature-compensated axle load measurement using two separate identical strain gauges mounted above and below the truck's steering axle. In this example, the strain gauges (10) are mounted on the axle beam (1) either directly with adhesive or with four welded brackets (12), or on castings (11) made at the time of manufacturing the axle beam (1). The strain gauges (10) are attached to the brackets (12), or to the casting (11) with four fasteners (7). The strain gauge (10) is centered on the centerline (5) of the axle beam (1) and is equidistant from the vehicle springs (4).

ITEM-BY-ITEM DESCRIPTION OF THE FIG. 1

1. Axle beam of the truck's steering axle;
2. Casting for attaching the strain gauge;
3. Bracket for attaching the strain gauge;
4. Attachment points for the vehicle springs;
5. Centerline of the axle beam of the truck's steering axle;

6. Strain gauge;
7. Items of the strain gauge's fastener.

2. ITEM-BY-ITEM DESCRIPTION OF THE FIG.
2

1. Axle beam of the truck's steering axle;
4. Attachment points for the vehicle springs;
5. Centerline of the axle beam of the truck's steering axle;
7. Items of the strain gauge's fastener;
8. Casting for attaching the strain gauge;
9. Bracket for attaching the strain gauge;
10. Strain gauges.

3. ITEM-BY-ITEM DESCRIPTION OF THE FIG.
3

1. Axle beam of the truck's steering axle;
4. Attachment points for the vehicle springs;
5. Centerline of the axle beam of the truck's steering axle;
7. Items of the strain gauge's fastener;
10. Strain gauges.
11. Casting for attaching the strain gauge;
12. Bracket for attaching the strain gauge.

The method is used as follows.

Initially, based on the design features of the vehicle axle, a location is selected for the strain gauges. After considering the technical characteristics of mounting the strain gauges in the selected location on the axle, one of the two proposed variants is implemented for measuring the vehicle axle load.

The first variant of measuring the vehicle axle load involves mounting two strain gauges on the vehicle axle to measure the deflection in two mutually perpendicular directions. One strain gauge measures the tensile/compressive strain of the vehicle axle along its longitudinal axis and, in this case, the gauge can be mounted on the upper or lower plane of the axle, with the mounting location selected according to the design characteristics of the vehicle axle. The second strain gauge measures the tensile/compressive strain of the vehicle axle along its transverse axis, and the gauge can be mounted on any of the axle planes (upper, lower, or lateral), with the mounting location selected according to the design characteristics of the vehicle axle. The axle load of the vehicle is calculated by measuring the difference between the electrical output signals from strain gauges.

The second variant of measuring the vehicle axle load involves mounting two strain gauges on the vehicle axle to measure the deflection in one direction. One strain gauge measures the tensile/compressive strain of the vehicle axle along its longitudinal axis and is mounted on the upper plane of the axle, with the mounting location selected according to the design characteristics of the vehicle axle. The second strain gauge measures the tensile/compressive strain of the vehicle axle along its longitudinal axis and is mounted on the lower plane of the axle, with the mounting location selected according to the design characteristics of the vehicle axle. The axle load of the vehicle is calculated by measuring the difference between the electrical output signals from strain gauges.

The difference between electrical output signals from strain gauges can be calculated either by using an analog method and connecting gauges to one transducer and changing polarity of electrical output signal from one of the strain gauges, or by using a digital method and connecting gauges to two transducers and then calculating the difference between electrical signals from strain gauges with a microcontroller.

In the first variant of the above method, the strain ε measured by the gauge is described by the following formula:

$$\varepsilon(F, T) = \varepsilon_2(F) + T_2\left(k_2 - k_1 \times \frac{T_1}{T_2}\right) \times \varepsilon_1^0(T) + A,$$

where

T$_2$ is the axle's temperature;

T$_1$ is the gauge's temperature;

k$_2$ is the coefficient of thermal expansion of the axle's material;

k$_1$ is the coefficient of thermal expansion of the gauge's material;

$$\varepsilon_1^0(T)$$

is the temperature dependence of the gauge readings;

$$\varepsilon_2(T)$$

is the dependence of the axle strain from the applied load;

A is a constant value resulting from the nonzero strain that occurs after the gauge is mounted on the axle.

The effect of temperature in the above formula does not depend on the load applied to the axle, but it is determined only by the difference between the coefficients of thermal expansion and temperatures of the vehicle axle and the strain gauge. As a result, the contribution of temperature effects in the output signal of two identical strain gauges mounted in locations with the same temperature will be identical. Therefore, using the difference in electrical output signals from two identical strain gauges mounted in locations with the same temperature allows to exclude the influence of temperature effects.

In the first variant of the method, the difference Δ$_1$ between the first signal and the second signal is described by the following formula:

$$\Delta_1 = \varepsilon_1^1(F, T) - \varepsilon_1^2(F, T) = \varepsilon_2(F) + A_1^{1-2},$$

where $$\varepsilon_1^1(F, T)$$

is the signal from the gauge that measures the tensile/compressive strain of the axle material along its longitudinal axis;

$$\varepsilon_1^2(F, T)$$

is the signal from the gauge that measures the tensile/compressive strain of the axle material along its transverse axis;

$$A_1^{1-2}$$

is the dependence of the axle strain from the applied load;

A$_1^{1-2}$ is a constant value resulting from the nonzero strain that occurs after the gauges are mounted on the axle.

Therefore, when using the first variant of the method, the difference Δ1 between the first and second signals from the gauges depends only on the strain of the axle caused by the applied load. This expression is true as long as the strain gauges are identical and the temperature is the same at the locations where they are mounted.

For the second variant of the method for measuring the vehicle axle load, the strain ε measured by the gauge is described by the following formula:

$$\Delta_2 = \varepsilon_2^1(F, T) - \varepsilon_2^2(F, T) = 2 \cdot \varepsilon_2(F) + A_2^{1-2},$$

where $$\varepsilon_2^1(F, T)$$

is the signal from the gauge that measures the tensile/compressive strain of the axle material along its longitudinal axis;

$$\varepsilon_2^2(F, T)$$

is the signal from the gauge that measures the tensile/compressive strain of the axle material along its longitudinal axis;

ε$_2$(F) is the dependence of the axle strain from the applied load;

$$A_2^{1-2}$$

is a constant value resulting from the nonzero strain that occurs after the gauges are mounted on the axle.

Therefore, when using the second variant of the method, the difference D2 between the first and second signals from the gauges depends only on the doubled strain of the axle caused by the applied load. This formula will be true as long as the strain gauges are identical and the temperature is the same at the locations where they are mounted.

The technical result of this invention is minimizing the effect of ambient temperature fluctuations on the readings of the strain gauge mounted on the axle of the vehicle and ensuring that the gauge performs only the functions of reflecting the characteristics of the weight loads on the axle.

The invention claimed is:

1. A method for measuring a vehicle axle load, the method comprising:

obtaining a first electrical output signal from a strain gauge mounted on the vehicle axle and measuring the tensile/compressive strain of the axle along its longitudinal axis, obtaining a second electrical output signal from the strain gauge mounted on the vehicle axle and measuring the tensile/compressive strain of the axle along its transverse axis, and calculating the vehicle axle load based on the difference between the first and the second electrical output signals, wherein the calculating of the value of the axle load is further based on a temperature of the strain gauge, a temperature difference between the strain gauge and a beam of the vehicle axle, and differences in the coefficients of thermal expansion between the strain gauge and the beam of the vehicle axle.

2. The method of claim 1, wherein the temperature difference between the strain gauge and the beam is up to 5° C.

3. The method of claim 1, wherein the vehicle axle load is calculated with a margin of error of no more than 2% in an ambient temperature range of −50° C. to +70° C.

4. The method of claim 1, wherein the strain gauge comprises first and second strain gauges mounted within a single housing.

5. The method of claim 1, wherein the strain gauge is centered on a centerline of the beam equidistant from vehicle springs.

6. The method of claim 1, wherein the strain of a load at a temperature $\varepsilon(F,T)$ is calculated as $$\varepsilon(F, T) = \varepsilon_2(F) + T_2\left(k_2 - k_1 \times \frac{T_1}{T_2}\right) \times \varepsilon_1^0(T) + A,$$

where:

$T_2$ is the axle temperature;

$T_1$ is the strain gauge temperature;

$k_2$ is the coefficient of thermal expansion of the axle;

$k_1$ is the coefficient of thermal expansion of the strain gauge;

$$\varepsilon_1^0(T)$$

is temperature dependence of readings of the strain gauge;

$\varepsilon_2(F)$ is dependence of the axle strain from the load; and

A is a constant value resulting from non-zero strain that occurs after the strain gauge is mounted on the axle.

7. The method of claim 6, wherein the difference between the first and the second electrical output signals $\Delta_1$ is calculated as $$\Delta_1 = \varepsilon_1^1(F, T) - \varepsilon_1^2(F, T) = \varepsilon_2(F) + A_1^{1-2},$$

where $$\varepsilon_1^1(F, T)$$

is the signal from the strain gauge that measures tensile/compressive strain of the axle along its longitudinal axis;

$$\varepsilon_1^2(F, T)$$

is the signal from the strain gauge that measures tensile/compressive strain of the axle along its transverse axis;

$\varepsilon_2(F)$ is dependence of the axle strain from the load; and $$A_1^{1-2}$$

is a constant value resulting from non-zero strain that occurs after the strain gauge is mounted on the axle.

8. A method for measuring a vehicle axle load, the method comprising:

obtaining a first electrical output signal from a first strain gauge mounted on the upper plane of the vehicle axle and measuring the tensile/compressive strain of the axle along its longitudinal axis, obtaining a second electrical output signal from a second strain gauge mounted on the lower plane of the vehicle axle and measuring the tensile/compressive strain of the axle along its longitudinal axis, and calculating the vehicle axle load based on the difference between the first and the second electrical output signals, wherein the calculating of the value of the axle load is further based on a temperature of the first and second strain gauges, a temperature difference between the first and second strain gauges and a beam of the vehicle axle, and differences in the coefficients of thermal expansion between the first and second strain gauge and the beam of the vehicle axle, and wherein useful strain signals are doubled compared to the method of claim 1.

9. A method for measuring a vehicle axle load, the method comprising:

obtaining a first electrical output signal from a first strain gauge mounted on the upper plane of the vehicle axle and measuring the tensile/compressive strain of the axle along its longitudinal axis, obtaining a second electrical output signal from a second strain gauge mounted on the lower plane of the vehicle axle and measuring the tensile/compressive strain of the axle along its longitudinal axis, and calculating the vehicle axle load based on the difference between the first and the second electrical output signals, wherein the calculating of the value of the axle load is further based on a temperature of the first and second strain gauges, a temperature difference between the first and second strain gauges and a beam of the vehicle axle, and differences in the coefficients of thermal expansion between the first and second strain gauge and the beam of the vehicle axle.

10. The method of claim 9, wherein the temperature difference between the first and second strain gauges and the beam of the vehicle axle is up to 5° C.

11. The method of claim 9, wherein the vehicle axle load is calculated with a margin of error of no more than 2% in an ambient temperature range of −50° C. to +70° C.

12. The method of claim 9, wherein the first and second strain gauges are mounted within a single housing.

13. The method of claim 9, wherein the first and second strain gauges are mounted in perpendicular directions along the vehicle axle.

14. The method of claim 13, wherein vehicle axle is a steering axle.

15. The method of claim 9, wherein the first and second strain gauges are centered on a centerline of the beam equidistant from vehicle springs.

* * * * *